United States Patent

Cavallari

[15] 3,641,267

[45] Feb. 8, 1972

[54] STABILIZED VOLTAGE-STEP-DOWN CIRCUIT ARRANGEMENT

[72] Inventor: Eugenio Cavallari, Milan, Italy

[73] Assignee: Ates Componenti Elettronici S.p.A., Milan, Italy

[22] Filed: July 29, 1969

[21] Appl. No.: 845,709

[30] Foreign Application Priority Data

Aug. 1, 1968 Italy ........................................ 19702

[52] U.S. Cl. .................... 178/7.3 R, 178/DIG. 11, 323/22 T, 375/492

[51] Int. Cl. .................................................. H04n 5/44

[58] Field of Search ................ 178/6 PS; 323/22 T; 325/492; 175/7.3, 7.1

[56] References Cited

UNITED STATES PATENTS 3,460,023 8/1969 Becker .............................. 323/22 T 3,510,578 5/1970 Bazin ...................................... 178/7.1

3,519,741 7/1970 Knight .................................. 323/22 T

*Primary Examiner*—Robert L. Griffin

*Assistant Examiner*—Richard P. Lange

*Attorney*—Karl F. Ross

[57] ABSTRACT

A rectified supply voltage from an AC utility outlet is chopped under the control of a recurrent pulse in the load circuit, specifically the flyback pulse of the horizontal sweep circuit of a television receiver, with the aid of a normally blocked chopping transistor connected to be unblocked by an intermittent biasing current from a secondary winding of a transformer whose primary winding acts as an inductance of a smoothing network for the chopped supply voltage. The resultant reduced output voltage is stabilized by the provision of a Zener diode in the input of either the chopping transistor or an ancillary transistor in series therewith.

9 Claims, 2 Drawing Figures

Figure 1:
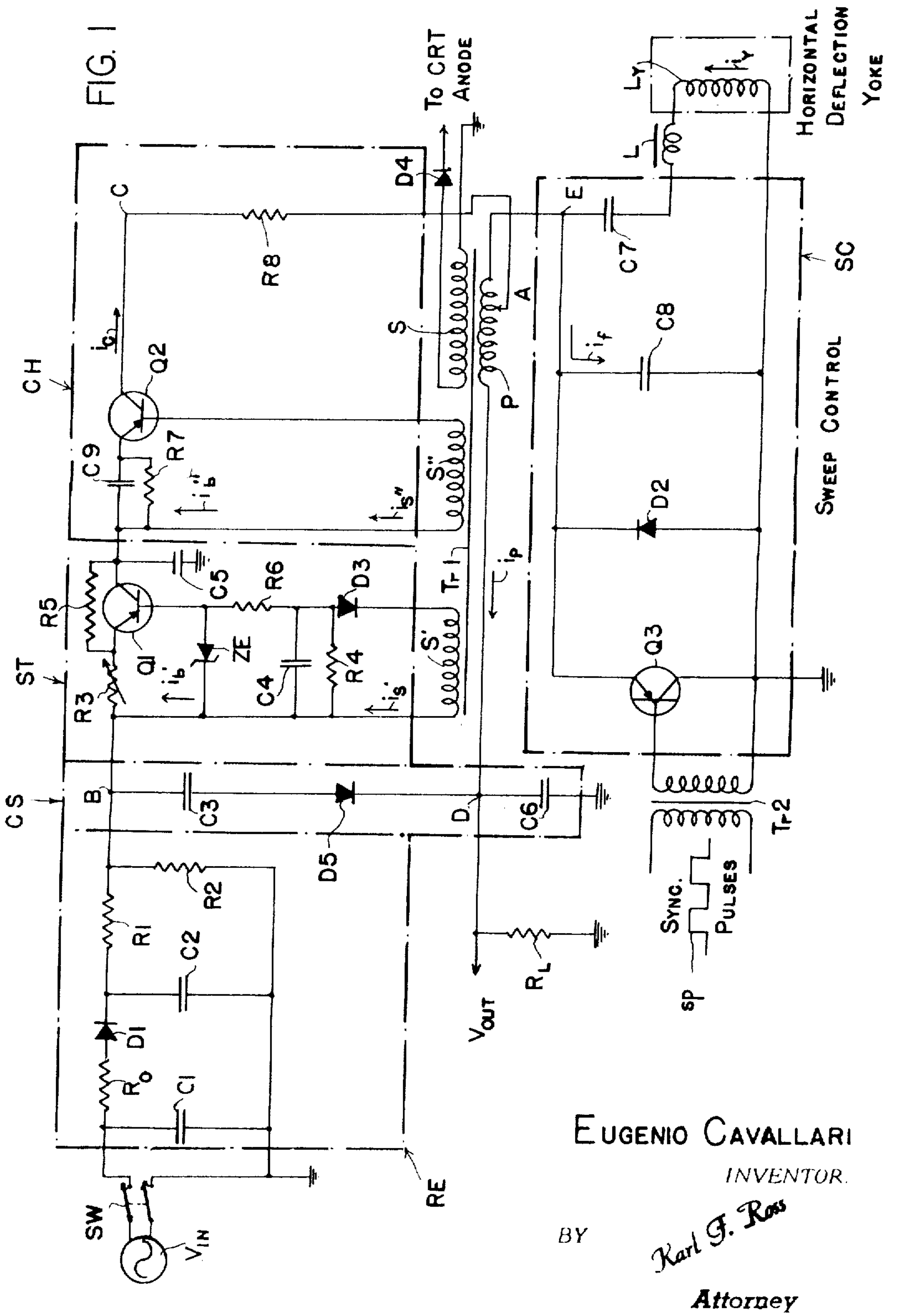

EUGENIO CAVALLARI
INVENTOR.

BY Karl F. Ross
Attorney

EUGENIO CAVALLARI

INVENTOR.

BY Karl F. Ross

Attorney

STABILIZED VOLTAGE-STEP-DOWN CIRCUIT ARRANGEMENT

My present invention relates to a power-supply network designed to step down the voltage of an available AC or DC source of electric energy, such as an outlet from the utility mains of a building, for feeding a low-voltage direct-current load.

In commonly owned application Ser. No. 802,868, filed 27 Feb. 1969 by Vicenzo Sansone and Franco Gatti, there has been disclosed a power supply of this description specifically (though not exclusively) adapted to energize the various electrodes and the sweep circuits of a television receiver. Avoiding the need for a stepdown transformer, the supply network referred to includes a chopper in the form of one or more normally blocked transistors inserted between the input circuit and a load circuit, in combination with control means for periodically unblocking the transistor or transistors to generate a pulse train which is then integrated by an impedance path in the transistor output. When used in combination with a television system supplied thereby, the network advantageously derives its unblocking pulses from the flyback stroke of the horizontal sweep circuit.

An incidental advantage of the system described, aside from eliminating the need for a costly stepdown transformer, is the fact that any short circuit developing in the output of the chopper prevents the pulsing of the transistor or transistors which therefore remain blocked and cut off the power supply.

Such a circuit arrangement is capable of reducing an AC supply voltage of, say, 220 volts RMS to a DC level of about 30 V. This voltage level, however, is not accurately maintainable upon changes in the supply voltage and/or in the load. Adjustment of the brightness control of a television receiver to intensify the image, for example, could drain enough power from the system to reduce the energization of the deflecting coils to an extent causing objectionable shrinkage of the frame size. This so-called pumping action is due to the fact that the operation of the chopper tends to deliver a constant power rather than a constant voltage or current.

The principal object of my present invention, therefore, is to provide an improved circuit arrangement of the general character described above in which the aforementioned drawback of an inconstant output voltage is eliminated.

A more specific object of this invention is to provide a system wherein variations in input voltage, within wide limits do not substantially affect the magnitude of the output voltage.

A further object, allied with the preceding one, is to provide simple means for changing this output voltage irrespectively of the magnitude of the input voltage.

In accordance with an important feature of this invention, I stabilize the reduced output voltage of the aforedescribed chopper by including voltage-limiting means, such as a Zener diode, in the input circuit of either the main chopping transistor or an ancillary transistor connected ahead of the main transistor in cascade therewith. In either case, the base current and therefore the collector current of the corresponding transistor, generated in the presence of an unblocking pulse, is limited with consequent limitation of the amplitude of the pulse to be integrated. In the preferred circuit arrangement, in which the reactive network effecting this integration includes the primary winding of a transformer with a secondary winding driving the chopping transistor (as well as another secondary winding for the ancillary transistor, if any), the current flowing through this primary winding may vary inasmuch as any excess secondary current is dissipated through the Zener diode connected between the base and the emitter of the associated transistor. Any change in load current, therefore, will have only a negligible effect upon the integrated output voltage.

According to another feature of my invention, the output connection from the chopping transistor to the aforementioned transformer primary terminates at an intermediate tap of that primary whereby the latter functions as an autotransformer providing a step-up voltage at its extremity connected to the sweep circuit generating the flyback stroke. Thus, the voltage delivered to the sweep circuit (or any other load) can be selected without regard to the circuit parameters of the chopper and its feedback transformer.

Figure 2:
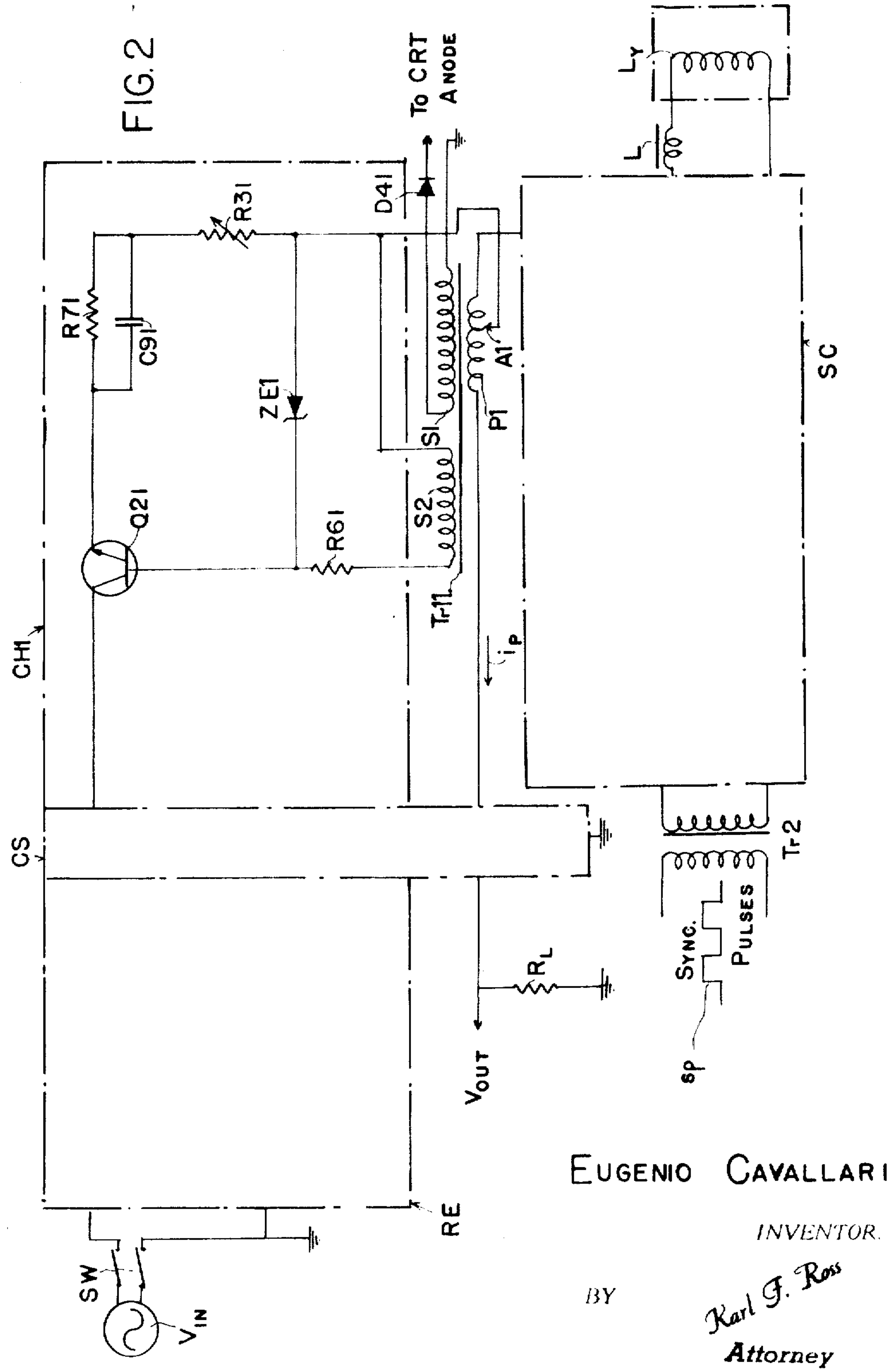

The invention will be described in greater detail with reference to the accompanying drawing in which:

FIG 1 is a circuit diagram of a power-supply network representing an illustrative embodiment; and FIG. 2 is a view similar to FIG. 1, showing a modification.

The supply network shown in FIG. 1 comprises a source of alternating input voltage $V_{in}$ constituted, for example, by a utility outlet of 220 v. rms. This voltage, connected across the network by a manual switch SW, is rectified in a circuit RE shown to include an input resistor $R_O$, a diode D1, and a series resistor R1, a shunt resistor R2 and two shunt condensers C1, C2. The output terminal B of this RC network is connected to ground through a starting circuit CS including a condenser C3, a diode D5 and a further condenser C6 in series, the latter being shunted by a load resistor $R_L$ across which a reduced output voltage $V_{out}$ is developed. Point B is also connected, via an adjustable resistor R3, to the emitter of a first transistor Q1, shown to be of the PNP type, whose collector is coupled by way of a differentiation circuit R7, C9 to the emitter of a similar second transistor Q2; the output terminal C of transistor Q2, joined to the collector thereof, is connected through a ballast resistor R8 to a tap A on the primary winding P of a transformer *Tr*1 which extends to the junction D of condenser C6 and diode D5. Transistor Q1 forms part of a voltage-stabilization stage ST while transistor Q2 is included in a chopper stage CH.

Transformer *Tr*1 has two secondaries S', S'' respectively connected across the emitter and base electrodes of transistors Q1 and Q2. Winding S' lies in series with a diode D3 and a resistor R6. Winding S'' lies in series with the network R7, C9. Another differentiation circuit R4, C4 is bridged across the winding S' in series with diode D3 and is in turn shunted by a Zener diode ZE in series with resistor R6. A further secondary winding S of transformer *Tr*1 supplies a stepped-up voltage, by way of a rectifying circuit here simply represented by a diode D4, to a high-voltage anode of an associate cathode-ray tube not further illustrated, this tube being provided with the usual scanning means including a horizontal sweep-control circuit SC and an electromagnetic yoke simply shown as a coil $L_y$ in series with an adjustable choke L.

Sweep-control circuit SC comprises a storage condenser C7 connected, in series with coils L and $L_y$, between ground and junction E, this series combination being further shunted by a flyback condenser C8 of substantially lower capacitance than condenser C7, a diode D2, and the emitter-collector circuit of an auxiliary transistor Q3 whose base and collector periodically receive synchronizing pulses *sp* from a source not shown by way of a transformer *Tr*2. Owing to the autotransformer action of primary P, any voltage difference between points A and D is translated into a larger voltage difference between points E and D.

When the system is first connected across source $V_{in}$, upon closure of manual switch SW, the resulting voltage surge at point B drives the junction E and the tap A positive, thereby charging the initially discharged condensers C7 and C8 through the reactive starting circuit CS and the winding P over a path bypassing the blocked transistors Q1, Q2. This charging step is significant only during cut in since, as will presently become apparent, the condensers C7 and C8 are periodically recharged through the chopper CH during steady-state operation.

Let us consider a time when the electronic switch constituted by transistor Q3 is closed by an unblocking pulse *sp*. A current *y* passes at this instant through yoke $L_Y$ in the direction indicated by an arrow in FIG. 1 (taken as positive), thereby discharging the condenser C7 through transistor Q3 at a rate determined by the resonance frequency of the tuned series circuit $L_y$, L, C7. As soon as pulse *sp* terminates, transistor Q3 cuts off whereupon the yoke current $i_y$ flows into condenser C8 which charges up at a rate depending on the resonance frequency of series reactances $L_y$, L, C8 (it being assumed that the capacitance of condenser C7 is so much larger than that of condenser C8 as to have only a negligible effect upon the charging of the latter). This charging of condenser C8, by a current flow $i_f$ also shown in FIG. 1, begins to raise the potential of point E whereby a current surge $i_p$ through primary P is initiated, the direction of this surge (arrow in FIG. 1) being here taken as positive. This surge, in turn, gives rise to a secondary current $i_s'$, $i_s''$ in each of windings S', S''. Differentiation of this current flow by the circuits R4, C4 and R7, C9 gives rise to base currents $i_b'$, $i_b''$. The resultant flow of collector current $i_c$ through transistor Q2 sharply raises the potential of point C and entrains a similar rise in the potential of point A, with a corresponding higher rise in the potential of point E.

As soon as the flyback current $i_f$ stops, primary current $i_p$ reverses, secondary currents $i_s'$, $i_s''$ cease and the base currents $i_b'$, $i_b''$ go negative. Owing to the finite sweepout time of transistors Q1 and Q2, however, the flow of collector current $i_c$ continues for a short period, condenser C8 meanwhile discharging through inductances L, $L_y$ and capacitor C7. The flow of negative yoke current $i_y$ continues thereafter by way of diode D2 which becomes conductive as soon as point E is driven negative, with reference to ground, by the inverted flyback current. At this stage, however, the yoke current is again controlled by the reactances L, $L_y$, C7 to the exclusion of the capacitance C8 which has been short circuited by the diode D2. Thus, the substantially linear rise in yoke current is more gradual than its descent during the flyback interval.

At some point between the end of that flyback interval and the instant when current $i_y$ goes to zero, a new synchronizing pulse *sp* appears in the input of switching transistor Q3. The resulting unblocking of this transistor takes effect, however, only upon the reversal of the yoke current whereupon this current again flows through the transistor as previously described, the cycle being then repeated.

Impedances P, C6 and $R_L$ represent an integrating circuit which substantially maintains the load voltage $V_{out}$ i.e., the potential of point D, at an average level of, say, 30 v.

The potential of points A and E is not changed during the forward sweep of the beam so that the linearity of that sweep inherent in the design of the control circuit SC is not affected.

The output voltage $V_{out}$ may be used to control the vertical beam deflection, to energize the generator of synchronizing pulses *sp* and to drive other equipment in the audio or video channels of the television receiver containing the aforementioned cathode-ray tube. Naturally, transformer Tr1 may have additional secondary windings leading to other loads and, if desired, inductances similar to coil Ly may be energized in parallel therewith or may be included in other series-resonant circuits branched across condenser C8.

The provision of Zener diode ZE in the input circuit of ancillary transistor Q1 limits the base current $i_b'$ and therefore the collector current passing this transistor, with consequent limitation of the collector current $i_c$ in the output of main transistor Q2 cascaded therewith. This, in turn, stabilizes the potential of tap A, reached during the flyback stoke, and the proportionally larger voltage at the junction E of sweep-control circuit SC. The magnitude of the latter voltage, which is determined by the characteristics of transistor Q3, can thus be selected independently of the breakdown potential of Zener diode ZE, and of other parameters in the stabilizer and chopper stages ST and CH, through suitable adjustment of tap A on primary P or through a provision of additional, fixed taps. In like manner, compensating adjustments may be made upon a major change in the supply voltage $V_{in}$, e.g., from 220 to 115 volts rms.

A condenser C5, effectively shunting the main transistor Q2, is connected between ground and the collector of ancillary transistor Q1, this transistor in turn being bridged by a damping resistor R5 which complements the capacitor C5 to form an integrating network. Resistors R3 and R5 together constitute an adjustable voltage divider to whose junction the emitter of transistor Q1 is connected. The magnitude of resistor R5 is, of course, so chosen that fluctuations in the supply voltage, e.g., up to ±20 percent, are effectively suppressed without undue shunting of transistor Q1. A residual hum involving, for example, a peak-voltage variation of 40 v. across filter condenser C2 can be reduced to a voltage fluctuation of about 0.5 v. across the terminals of condenser C5. With condenser C2 charging to, say, a voltage of +290 v. (corresponding to 220 volts rms), condenser C5 may be maintained at +220 v. while point E reaches a potential of +250 v.

FIG. 2 shows a modified chopper CH1 comprising a single transistor Q21, of the NPN type, whose input circuit includes a Zener diode ZE1 connected between its base and its emitter in series with a variable resistor R31 and a differentiation network R71, C91; this input circuit is connected, by way of a further resistor R61, in series with a secondary S2 of a transformer Tr11 whose other secondary S1 feeds the enode of the cathode-ray tube via a diode D41. The output of transistor Q21, delivered by its emitter, is fed back to the primary P1 of transformer Tr11 via a tap A1. The associated rectifying, start and sweep circuits RE, CS and SC are the same as in the preceding embodiment and the operation of the system is similar to that described in connection with FIG. 1.

The emitter current $i_e$ of transistor Q21 can be expressed, in terms of the breakdown voltage $V_z$ of Zener diode ZE1 and the base-emitter voltage $V_{be}$ of the transistor, by the formula $$i_e = \frac{V_z - V_{be}}{R71 + R31}$$

with $V_{be} \leqq V_z$. The power $P_{out}$ supplied by the chopper is then given by the formula $$P_{out} = \frac{i_e \cdot v_f \cdot t}{T}$$

where $V_f$ is the peak voltage of point A1 during the flyback pulse, *t* is the period of conduction of transistor Q21 and T is the duration of the line sweep. The output power $P_{out}$ is distributed among the several loads, including the sweep circuit SC, with any excess dissipated by the Zener diode ZEL. Thus, as long as enough input power is available from the supply source $V_{in}$, the flyback voltage $V_f$ will be constant inasmuch as the various parameters in the foregoing formula do not depend on the supply voltage.

Analogous considerations apply to the system of FIG. 1.

The following table lists, for a television power supply of the type shown in FIG. 1, the values of the output voltage $V_{c5}$ of stabilizing transistor Q1 (as developed across capacitor C5), the collector current $i_{c1}$ of transistor Q1 and the collector-emitter voltage $V_{ce}$ of this transistor as well as the power $P_{q1}$ dissipated in the stage ST, with different load currents $i_L$ drawn by the associated television set; the currents are given in milliamperes, the voltages in volts and the power in watts.

TABLE

| $V_{in}$ (RMS) | | $i_L$=150ma. | $i_L$=200ma. | $i_L$=250ma. |
|---|---|---|---|---|
| 242 | $V_{c5}$ | 222 | 220 | 221 |
| | $i_{c1}$ | 38 | 105 | 160 |
| | $V_{ce}$ | 89 | 82 | 74 |
| | $P_{q1}$ | 3.4 | 8.6 | 11.8 |
| 220 | $V_{c5}$ | 220 | 220 | 220 |
| | $i_{c1}$ | 67 | 130 | 190 |
| | $V_{ce}$ | 62 | 57 | 52 |
| | $P_{q1}$ | 4.2 | 7.5 | 10 |
| 198 | $V_{c5}$ | 219 | 219 | 217 |
| | $i_{c1}$ | 105 | 165 | 218 |
| | $V_{ce}$ | 36 | 30 | 25 |
| | $P_{q1}$ | 3.8 | 4.9 | 5.45 |
| 190 | $V_{c5}$ | 215 | 214 | 208 |
| | $i_{c1}$ | 115 | 172 | 210 |
| | $V_{ce}$ | 24 | 20 | 20 |

| | | | | |
|---|---|---|---|---|
| | $P_{et}$ | 2.76 | 3.44 | 4.2 |
| 180 | $V_{cb}$ | 210 | 204 | 198 |
| | $i_{ct}$ | 125 | 170 | 205 |
| | $V_{ce}$ | 14 | 15 | 17 |
| | $P_{et}$ | 1.75 | 2.55 | 3.48 |

I claim:

1. A power-supply network for converting a continuous supply voltage into a reduced continuous output voltage, comprising an input circuit connected to receive said supply voltage, a load circuit, transformer means with a primary winding and a secondary winding inductively coupled to each other, circuit means including normally blocked transistor means connecting said input circuit across said load circuit, control means including said secondary winding for periodically unblocking said transistor means to generate a pulse train in the output thereof, impedance means including said primary winding in cascade with the output of said transistor means for integrating said pulse train to generate the reduced output voltage, and voltage-limiting means in said input circuit connected across said secondary winding for stabilizing the current flow through said transistor means to maintain said output voltage substantially constant.

2. A network as defined in claim 1 wherein said load circuit comprises part of a television receiver provided with a sweep circuit including a source of synchronizing pulses, said primary winding being connected across said sweep circuit for energization in the rhythm of said synchronizing pulses, said circuit means including a connection from the output of said transistor means to an intermediate tap on said primary winding.

3. A network as defined in claim 2 wherein said connection includes a resistor.

4. A network as defined in claim 1 wherein said voltage limiting means comprises a Zener diode.

5. A network as defined in claim 4 wherein said transistor means has an emitter electrode and a base electrode, said Zener diode being connected between said electrodes.

6. A network as defined in claim 5, further comprising a differentiation circuit connected between said electrodes.

7. A network as defined in claim 5, further comprising an adjustable resistor connected between said electrodes in series with said Zener diode.

8. A network as defined in claim 5 wherein said transistor means comprises a main transistor and an ancillary transistor, said emitter electrode and said base electrode forming part of said ancillary transistor, the latter transistor also having a collector electrode connected to an input of said main transistor, said impedance means further including a capacitor connected to said collector electrode in shunt with said main transistor.

9. A network as defined in claim 8, further comprising a damping resistor connected across said emitter and collector electrodes in series with said capacitor.

* * * * *